(12) United States Patent
Goldbach et al.

(10) Patent No.: US 12,435,174 B2
(45) Date of Patent: Oct. 7, 2025

(54) FUNCTIONAL FLUOROPOLYMERS

(71) Applicant: Arkema Inc., King of Prussia, PA (US)

(72) Inventors: James T. Goldbach, Paoli, PA (US); Wengsheng He, Wayne, PA (US); Andrew Kahn, Eagleville, PA (US)

(73) Assignee: Arkema Inc., King of Prussia, PA (US)

( * ) Notice: Subject to any disclaimer, the term of this patent is extended or adjusted under 35 U.S.C. 154(b) by 847 days.

(21) Appl. No.: 17/045,263

(22) PCT Filed: Apr. 9, 2019

(86) PCT No.: PCT/US2019/026490
§ 371 (c)(1),
(2) Date: Oct. 5, 2020

(87) PCT Pub. No.: WO2019/199752
PCT Pub. Date: Oct. 17, 2019

(65) Prior Publication Data
US 2021/0171693 A1    Jun. 10, 2021

Related U.S. Application Data

(60) Provisional application No. 62/655,453, filed on Apr. 10, 2018.

(51) Int. Cl.
| | |
|---|---|
| C07C 21/18 | (2006.01) |
| C07C 57/52 | (2006.01) |
| C07C 69/54 | (2006.01) |
| C08F 4/28 | (2006.01) |
| C08F 214/22 | (2006.01) |
| C08F 220/22 | (2006.01) |
| C08F 283/02 | (2006.01) |
| C08K 3/04 | (2006.01) |
| C08K 3/22 | (2006.01) |
| C08K 3/32 | (2006.01) |
| C08L 27/16 | (2006.01) |
| C09D 127/16 | (2006.01) |
| C09D 133/16 | (2006.01) |
| C09D 151/08 | (2006.01) |
| H01M 4/02 | (2006.01) |
| H01M 4/04 | (2006.01) |
| H01M 4/62 | (2006.01) |

(52) U.S. Cl.
CPC ............ *C08F 283/02* (2013.01); *C07C 21/18* (2013.01); *C07C 69/54* (2013.01); *C08F 214/22* (2013.01); *C08F 220/22* (2013.01); *C08K 3/04* (2013.01); *C08K 3/22* (2013.01); *C08K 3/32* (2013.01); *C09D 127/16* (2013.01); *C09D 133/16* (2013.01); *C09D 151/08* (2013.01); *H01M 4/623* (2013.01); *C08K 2003/2203* (2013.01); *C08K 2003/2227* (2013.01); *C08K 2003/2262* (2013.01); *C08K 2003/2289* (2013.01); *C08K 2003/2293* (2013.01); *C08K 2003/324* (2013.01); *C08K 2003/328* (2013.01); *C08K 2201/001* (2013.01); *C08K 2201/014* (2013.01)

(58) Field of Classification Search
CPC ...................................................... C07C 57/52
See application file for complete search history.

(56) References Cited

U.S. PATENT DOCUMENTS

| | | | |
|---|---|---|---|
| 4,322,511 A | | 3/1982 | Matsuda et al. |
| 4,683,040 A | * | 7/1987 | Seko .......................... C08J 5/22 |
| | | | 205/536 |
| 5,415,958 A | | 5/1995 | Takahashi et al. |
| 7,121,817 B2 | | 10/2006 | Yanagisawa et al. |
| 7,351,498 B2 | | 4/2008 | Watarai et al. |
| 8,337,725 B2 | | 12/2012 | Abusleme et al. |
| 11,643,486 B1 | * | 5/2023 | Kahn ................... C08F 214/225 |
| | | | 429/217 |
| 2007/0224510 A1 | * | 9/2007 | Yamamoto ........ H01M 10/0565 |
| | | | 429/316 |
| 2012/0148818 A1 | | 6/2012 | Adam et al. |
| 2016/0046746 A1 | † | 2/2016 | Ameduri |
| 2019/0296359 A1 | † | 9/2019 | Asano |

FOREIGN PATENT DOCUMENTS

| | | | | |
|---|---|---|---|---|
| CN | 104725544 A | † | 6/2015 | |
| JP | 54135400 A | * | 10/1979 | |
| JP | S5523567 B1 | | 6/1980 | |
| JP | S57137308 A | | 8/1982 | |
| JP | 2000-200623 A | † | 7/2000 | |
| JP | 2002-249522 A | † | 9/2002 | |
| JP | 2002-249589 A | † | 9/2002 | |
| JP | 2002249523 A | | 9/2002 | |
| JP | 2012219125 A | * | 11/2012 | ............ C08F 214/22 |
| WO | 2013110740 A1 | | 8/2013 | |

OTHER PUBLICATIONS

Machine translation of JP-54135400-A obtained from the European Patent Office in Mar. 2024 (Year: 2024).*
Machine translation of JP-2012219125-A obtained from the European Patent Office in Aug. 2024 (Year: 2024).*
Boschet, Frederick et al; "Radical Copolymerization of á, à-Difluoroacrylic Acid with Vinylidene Fluoride", Macromolecules, American Chemical Society, vol. 43, No. 11, pp. 4879-4888, Jun. 8, 2010.

\* cited by examiner
† cited by third party

*Primary Examiner* — Melissa A Rioja
(74) *Attorney, Agent, or Firm* — Joanne Rossi

(57) ABSTRACT

The invention relates to novel linear, semi-crystalline, functional fluoropolymers that have been obtained by copolymerizing a fluorinated vinylic monomer and a hydrophilic (meth)acrylic comonomer bearing a halogen functionality.

15 Claims, No Drawings

FUNCTIONAL FLUOROPOLYMERS

This application is a national stage application under 35 U.S.C. § 371 of PCT/US2019/026490, filed Apr. 9, 2019; which claims benefit to application US Provisional Application No. 62/655,453, filed Apr. 10, 2018; said applications incorporated herein by reference.

FIELD OF THE INVENTION

The invention relates to novel linear, semi-crystalline, functional fluoropolymers that have been obtained by copolymerizing a fluorinated vinylic monomer and a hydrophilic (meth)acrylic comonomer bearing a halogen functionality. At most 10.0 weight percent of the (meth)acrylic comonomer units are present in the copolymer as single monomer units between two fluoromonomer units. The invention also relates to a process for forming the fluoromonomers/(meth)acrylic copolymer.

BACKGROUND OF THE RELATED ART

Fluoropolymers are traditionally used for applications requiring special properties, such as low surface energy, high resistance to chemical attack, aging resistance, and electrochemical stability. However, these advantageous properties also make fluoropolymers difficult to work with and limits their applications. For example, the lack of functional groups on the fluoropolymers makes them difficult: to adhere to substrates, to facilitate cross-linking, to provide sites for subsequent chemical modification, to be wetted by water, and to add hydrophilic characteristics. There is a need for fluorinated polymers having modified properties, such as functional groups, which can augment their properties.

However it is difficult to add functional monomer units directly into the polymerizing polymer backbone, especially in a random manner, due to the aggressive nature of the fluorine-containing free radicals. Functionality has been added by several means, such as, by direct copolymerization of a functional monomer with the fluoromonomers, and by a post-polymerization grafting mechanism, such as the grafting of maleic anhydride onto a polyvinylidene fluoride homopolymer or copolymer, as described in U.S. Pat. No. 7,241,817, to form KYNAR® ADX resins available from Arkema Inc. (Pennsylvania, USA). WO 2013/110740 and U.S. Pat. No. 7,351,498 further describe functionalization of a fluoropolymer by monomer grafting or by copolymerization.

U.S. Pat. No. 5,415,958 discloses copolymerization of vinylidene fluoride with an unsaturated dibasic acid monoester polar monomer, to introduce carbonyl groups to the backbone of PVDF in order to improve its adhesion to different substrates.

U.S. Pat. No. 8,337,725 discloses copolymerization of vinylidene fluoride with at least one hydrophilic (meth) acrylic monomer of formula:

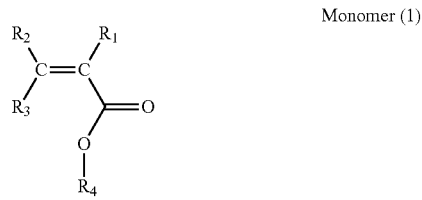

wherein each of R1, R2, R3, equal or different from each other, is independently a hydrogen atom or a $C_1$-$C_3$ hydrocarbon group, and $R_{OH}$ is a hydrogen or a $C_1$-$C_5$ hydrocarbon moiety comprising at least one hydroxyl group.

There is a need to further improve the adhesion performance of fluorinated polymers.

The art is silent as to functional fluoropolymers obtained by copolymerizing a fluorinated vinylic monomer and a hydrophilic (meth)acrylic comonomer bearing a halogen functionality, that allow for improved adhesion to a substrate, when compared to the non-functional fluoropolymer, while maintaining good mechanical and thermal properties.

BRIEF SUMMARY OF THE INVENTION

The invention relates to a fluorinated copolymer comprising a fluorinated vinylic monomer and a halogenated monomer (1):

Monomer (1)

wherein:
$R_1$, $R_2$, and $R_3$ is a hydrogen or a halogen (F, Cl, Br, I), and at least one is a halogen; $R_4$ is hydrogen, a $C_1$ to $C_{16}$ linear, branched, aryl, or cycloalkyl group, a $C_1$ to $C_{16}$ fluorinated linear, branched, aryl or cycloalkyl group, a fluorinated oligomer of hexfluoropropylene oxide, an alkali metal (lithium, sodium, potassium, rubidium, cesium), ammonium, alkylammonium, or alkylarylammonium ion.

The invention further relates to a formulation comprising the fluorinated copolymer in a solvent, and may further comprise conductive carbon additives and active material particles. Active materials for lithium ion battery cathode formulation include, but are not limited to: lithium iron phosphate (LFP), lithium nickel manganese cobalt oxide (NMC), lithium-manganese-cobalt-oxide (LCO), lithium-nickel-cobalt-aluminum oxide (NCA), lithium-manganese oxide (LMO), lithium-nickel-manganese-oxide (LNMO), and lithium manganese iron phosphate (LMFP). Active materials for anode formulation include, but are not limited to graphite, hard carbon, soft carbon, graphene, silicon, silicon monoxide (SiO), tin, or lithium titanate (LTO).

The invention further contemplates a process for preparing the fluorinated copolymer in an aqueous reaction medium, comprising:
a) forming an aqueous emulsion comprising at least one initiator, a stabilizer, at least one fluoromonomer, and a halogenated monomer (1) as defined above,
b) initiating copolymerization of said at least one fluoromonomer with said halogenated monomer (1) with stirring, under heat and super-atmospheric pressure.

The invention further relates to articles formed from the fluorinated copolymer, which benefit from the special properties of the functional copolymer. These articles find uses in applications such as for: an electrode or separator for a battery or capacitor; a hydrophilic porous membrane or hollow fiber membrane; an article coated on at least one surface with said functional fluoropolymer, impregnation of woven and unwoven fibers, and a multi-layer construction wherein said functional fluoropolymer forms a tie layer between a fluoropolymer layer and a polymer layer that is incompatible with said fluoropolymer layer.

"Copolymer" is used to mean a polymer having two or more different monomer units. "Polymer" is used to mean both homopolymer and copolymers. Polymers may be straight chain, branched, star comb, block, or any other structure. The polymers may be homogeneous, heterogeneous, and may have a gradient distribution of co-monomer units. All references cited are incorporated herein by reference. As used herein, unless otherwise described, percent shall mean weight percent. Unless otherwise stated, molecular weight is a weight average molecular weight as measured by GPC, using a polymethyl methacrylate standard. In cases where the polymer contains some cross-linking, and GPC cannot be applied due to an insoluble polymer fraction, soluble fraction/gel fraction or soluble faction molecular weight after extraction from gel is used. Crystallinity and melting temperature are measure by DSC as described in ASTM D3418 at heating rate of 10 C/min. Melt viscosity is measured in accordance with ASTM D3835 at 230° C. expressed in k Poise @100 Sec^(−1)

DETAILED DESCRIPTION OF THE INVENTION

Fluoropolymers, particularly poly(vinylidene fluoride) (PVDF) and its copolymers, find application as the binder in electrode articles used in lithium ion batteries. As the demand for greater energy density and battery performance intensifies, the need for reduction of the binder content in the electrodes has increased. To reduce the binder content, it is paramount to increase the performance of the binder material. One key binder performance matrix is determined by an adhesion test whereby a formulated electrode is subjected to a peel test. Improved binding performance increases the potential to reduce the overall binder loading, increasing active material loading and improving battery capacity and energy density. It has been shown that copolymers of fluorinated vinylic monomers with acid-functional comonomers lead to adhesion performance improvement. These approaches have also suffered from low reaction productivity, and difficulty to supply sufficient quantities of material to a rapidly-growing market. Here, we present a new copolymer and process with vastly improved productivity.

The functional fluoropolymers provide enhanced properties compared to the fluoropolymer, such as increased adhesion and hydrophilic characteristics. The fluoropolymer of the invention may be used in applications benefiting from a functional fluoropolymer including as binders in electrode-forming compositions and separator compositions, or in forming hydrophilic membranes and hollow fibers.

The invention solves the above-cited problems by providing a fluorinated copolymer comprising a fluorinated vinylic monomer and a monomer (1):

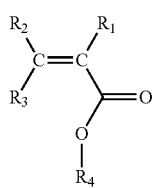

Monomer (1)

wherein:
$R_1$, $R_2$, and $R_3$ is a hydrogen or a halogen (F, Cl, Br, I), and at least one is a halogen;
$R_4$ is hydrogen, a $C_1$ to $C_{16}$ linear, branched, aryl, or cycloalkyl group, a $C_1$ to $C_{16}$ fluorinated linear, branched, aryl or cycloalkyl group, a fluorinated oligomer of hexfluoropropylene oxide, an alkali metal (lithium, sodium, potassium, rubidium, cesium), ammonium, alkylammonium, or alkylarylammonium ion.

The fluorinated vinylic monomer is selected from the group comprising: vinylidene fluoride (VDF), tetrafluoroethylene (TFE), trifluoroethylene (TrFE), chlorotrifluoroethylene (CTFE), hexafluoropropene (HFP), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, 2,3,3,3-tetrafluoropropene, fluorinated vinyl ethers including perfluoromethyl ether (PMVE), perfluoroethylvinyl ether (PEVE), perfluoropropylvinyl ether (PPVE), perfluorobutylvinyl ether (PBVE), longer alkyl chain perfluorinated vinyl ethers, fluorinated dioxoles, partially- or per-fluorinated alpha olefins of C4 and higher, partially- or per-fluorinated cyclic alkenes of C3 and higher, and combinations thereof.

The functional copolymer according to the invention is further characterized by the following embodiments.

According to one embodiment, the fluorinated copolymer comprises up to 10 wt % of Monomer (1), preferably 0.001 to 10.0 wt %, preferably from 0.01 to 10.0 wt % of Monomer (1) and 90.0 to 99.99 wt % of fluorinated vinylic monomer.

According to one embodiment, the fluorinated copolymer comprises vinylidene fluoride and Monomer (1).

According to one embodiment, the fluorinated copolymer comprises vinylidene fluoride and Monomer (1), wherein $R_1$ is fluorine.

According to one embodiment, the fluorinated copolymer comprises vinylidene fluoride and Monomer (1), wherein $R_1$ is fluorine and $R_4$ is $C_1$ to $C_{16}$ linear, branched or cycloalkyl group.

According to one embodiment, the fluorinated copolymer comprises vinylidene fluoride and Monomer (1), wherein $R_1$ and $R_2$ are fluorine and $R_4$ is $C_1$ to $C_{16}$ linear, branched or cycloalkyl group.

According to one embodiment, the fluorinated copolymer comprises vinylidene fluoride and Monomer (1), wherein $R_1$, $R_2$ and $R_3$ are fluorine and $R_4$ is $C_1$ to $C_{16}$ linear, branched or cycloalkyl group.

According to one embodiment, the fluorinated copolymer comprises vinylidene fluoride and Monomer (1), wherein $R_1$ is fluorine and $R_4$ is hydrogen or an alkali metal, ammonium, or alkylammonium.

According to one embodiment, the fluorinated copolymer comprises vinylidene fluoride and Monomer (1), wherein $R_1$ and $R_2$ are fluorine and $R_4$ is hydrogen or an alkali metal, ammonium, or alkylammonium.

According to one embodiment, the fluorinated copolymer comprises vinylidene fluoride and Monomer (1), wherein $R_1$, $R_2$ and $R_3$ are fluorine and $R_4$ is hydrogen or an alkali metal, ammonium, or alkylammonium.

According to one embodiment, Monomer (1) is randomly copolymerized as determined by nuclear magnetic resonance ($^{19}$F NMR and $^1$H NMR) of Monomer (1).

The invention further relates to a formulation comprising the fluorinated copolymer in a solvent. The solvent is preferably chosen from: n-methylpyrrolidone (NMP), dimethylsulfoxide (DMSO), N,N-dimethylformamide (DMF), triethylphosphite (TEP), acetone, tetrahydrofuran, methyl ethylketone (MEK), methyl isobutyl ketone (MiBK), ethyl acetate (EA), butyl acetate (BA), ethylene carbonate (EC), propylene carbonate (PC), dimethyl carbonate (DMC), diethyl carbonate (DEC) or ethyl methyl carbonate (EMC).

According to one embodiment, the formulation further comprises conductive carbon additives and active material particles in suspension in said solvent. Such formulation is particularly suitable for forming battery electrode films, notably positive (cathode) electrode or negative (anode) electrod for a lithium ion battery. Active material for lithium ion battery cathode formulation can be selected from the group, not limiting to, lithium iron phosphate (LFP), lithium nickel manganese cobalt oxide (NMC), lithium-manganese-cobalt-oxide (LCO), lithium-nickel-cobalt-aluminum oxide (NCA), lithium-manganese oxide (LMO), lithium-nickel-manganese-oxide (LNMO), and lithium manganese iron phosphate (LMFP). Active material for anode formulation can be from graphite, hard carbon, soft carbon, graphene, silicon, silicon monoxide (SiO), tin, or lithium titanate (LTO). The invention encompasses a battery comprising the fluorinated copolymer described herein.

The invention further contemplates a process for preparing the fluorinated copolymer in an aqueous reaction medium, comprising:
a) forming an aqueous emulsion comprising at least one initiator, a stabilizer, at least one fluorinated vinylic monomer, and a halogenated monomer (1) as defined above,
b) initiating copolymerization of said at least one fluorinated vinylic monomer with said halogenated monomer (1) with stirring, under heat and super-atmospheric pressure.

A polymerization reaction in accordance with the present invention may be carried out by charging a reactor with water (preferably deionized water), at least one fluorinated vinylic monomer, at least one halogenated Monomer (1) as defined above and optionally, one or more of a surfactant, a chain-transfer agent and/or an antifoulant. Air may be purged from the reactor prior to the introduction of the fluoromonomer. Water is added to the reactor before bringing the reactor to the desired starting temperature, but the other materials may be added before or after bringing the reactor to temperature. At least one radical initiator is added to start and maintain the polymerization reaction. Additional vinylic fluoromonomer(s) and/or additional functional monomer (Monomer 1) may be optionally added to replenish monomer that is consumed, and the other materials may be optionally added during the course of the polymerization to maintain the reaction and control the final product properties. In a typical embodiment, all monomer components will be fed at a controlled ratio (to each other) to maintain reaction pressure Monomer (1)

The structure of Monomer (1) is detailed above.

The Monomers (1) comonomers may be used in the reactor in an amount, for example, of from about 0.001 to about 15 weight percent, preferably from about 0.01 to about 15 weight percent based on total monomer. Preferably they are used in an amount from about 0.001 to about 10 weight percent, preferably 0.01 to about 10 weight percent based on total monomer. In various embodiments, the total amount of hydrophilic monomer(s) is at least 0.001, at least 0.01, at least 0.05, at least 0.1, at least 1.0 or at least 2.0 weight percent based on total monomer. In other embodiments, the total amount of hydrophilic monomer does not exceed 13.0, 10.0, 9.0, 7.0, 6.0, 5.0 weight percent based on total monomer. The hydrophilic (meth)acrylic comonomer (Monomer (1)) may be used in solution such as in aqueous solution for convenient handling.

In one embodiment, two or more different functional acrylates was found to provide increased adhesion. While not being bound by any particular theory, it is believed that different functionalities, for example an alcohol and acid functionality, could react or crosslink to form ester groups. The two or more different functionalities preferably are present in the same terpolymer, but could also be a blend of two or more different copolymers.

Surfactants

The surfactant used in the polymerization can be any surfactant known in the art to be useful in PVDF emulsion polymerization, including perfluorinated, partially fluorinated, and non-fluorinated surfactants. In a preferred embodiment, the PVDF emulsion of the present disclosure can be fluorosurfactant free, with no fluorosurfactants being used in any part of the polymerization. Non-fluorinated surfactants useful in the PVDF polymerization could be both ionic and non-ionic in nature including, but are not limited to, 3-allyloxy-2-hydroxy-1-propane sulfonic acid salt, polyvinylphosphonic acid, polyacrylic acids, polyvinyl sulfonic acid, and salts thereof, polyethylene glycol and/or polypropylene glycol and the block copolymers thereof, alkyl phosphonates and siloxane-based surfactants.

Surfactants can also be used in combination with hydrophilic (meth)acrylic comonomer to provide further stability to the polymer emulsion. Preferred surfactants are non-fluorinated hydrocarbon surfactants, siloxane surfactants or a combination thereof. For example a hydrophilic (meth) acrylic comonomer can be used in combination with sodium dodecyl benzene sulfonate (SDDBS), sodium octyl sulfonate, sodium lauryl sulfate, ammonium lauryl sulfate, or sodium laureth sulfate, among others. In certain embodiments of the invention, no fluorosurfactant is present in the aqueous emulsion and/or no fluorosurfactant is introduced during copolymerization of the fluorinated vinylic monomer with the hydrophilic (meth)acrylic comonomer. In one embodiment, the stabilizer is a polyelectrolyte. In another embodiment, the stabilizer of the polymer emulsion is a functionalized cellulose.

Initiators

The term "initiator" and the expressions "radical initiator" and "free radical initiator" refer to a chemical that is capable of providing a source of free radicals, either induced spontaneously, or by exposure to heat or light. Examples of suitable initiators include peroxides, peroxydicarbonates and azo compounds. "Initiators" also includes redox systems useful in providing a source of free radicals. The term "radical" and the expression "free radical" refer to a chemical species that contains at least one unpaired electron.

The radical initiator is added to the reaction mixture in an amount sufficient to initiate and maintain the polymerization reaction at a desired reaction rate. The order of addition may vary according to the desired process and latex emulsion characteristics.

The radical initiator may comprise a persulfate salt, such as sodium persulfate, potassium persulfate, or ammonium persulfate. The amount of persulfate salt added to the reaction mixture (based upon the total weight of monomer added to the reaction mixture) may, for example, be from about 0.002 to about 1.0 weight percent.

The radical initiator may comprise an organic peroxide such as an alkyl, dialkyl, or diacyl peroxide, peroxydicarbonates, and peroxy esters or mixtures thereof. A preferred dialkyl peroxide is di-tert-butylperoxide (DTBP), which may be added to the reaction mixture in an amount from about 0.01 to about 5 weight percent on total monomer, and is preferably added in an amount from about 0.05 to about 2.5 weight percent on total monomer. Preferred peroxydicarbonate initiators are di-n-propyl peroxydicarbonate and diisopropyl peroxydicarbonate, which may be added to the reaction mixture in an amount from about 0.5 to about 2.5 weight percent on total monomer. Peroxy ester initiators include tert-amyl peroxypivalate, tertbutyl peroxypivalate, and succinic acid peroxide.

The radical initiator may comprise an azo initiator, such as 2,2'-azobis(2 methyl-propionamidine)dihydrochloride.

The radical initiator may comprise a redox system. By "redox system" is meant a system comprising an oxidizing agent, a reducing agent and optionally, a promoter as an electron transfer medium. Oxidizing agents include, for example, persulfate salts; peroxides, such as hydrogen peroxide; hydroperoxides such as tert-butyl hydroperoxide and cumene hydroperoxide; and oxidizing metal salts such as, for example, ferric sulfate. Reducing agents include, for example, sodium formaldehyde sulfoxylate, sodium and potassium sulfite, ascorbic acid, bisulfite, metabisulfite, and reduced metal salts. The promoter is a component of the redox system which, in different oxidation states, is capable of reacting with both the oxidant and the reducing agent, thereby accelerating the overall reaction. Promoters include, for example, transition metal salts such as ferrous sulfate. In redox systems, the oxidizing agent and the reducing agent may be utilized in an amount from about 0.01 to about 0.5 weight percent on total monomer. The optional promoter may be utilized in an amount from about 0.005 to about 0.025 weight percent on total monomer. Redox systems are described in G. S. Misra and U. D. N. Bajpai, *Prog. Polym. Sci.*, 1982, 8(1-2), pp. 61-131.

Chain-Transfer Agents

Chain-transfer agents are added to the polymerization to regulate the molecular weight of the product. They may be added to a polymerization in a single portion at the beginning of the reaction, or incrementally or continuously throughout the reaction. The amount and mode of addition of chain-transfer agent depend on the activity of the particular chain transfer agent employed, and on the desired molecular weight of the polymer product. The amount of chain-transfer agent added to the polymerization reaction is preferably from about 0.05 to about 5 weight percent, more preferably from about 0.1 to about 2 weight percent based on the total weight of monomer added to the reaction mixture.

Oxygenated compounds such as alcohols, carbonates, ketones, esters, and ethers may serve as chain-transfer agents. Examples of oxygenated compounds useful as chain-transfer agents include isopropyl alcohol, as described in U.S. Pat. No. 4,360,652. Other classes of compounds which may serve as chain-transfer agents in the polymerization of halogen-containing monomers include, for example, halocarbons and hydrohalocarbons, such as chlorocarbons. Alkanes such as ethane and propane may also function as chain-transfer agents.

Buffering Agent

The polymerization reaction mixture may optionally contain a buffering agent to maintain a controlled pH throughout the polymerization reaction. The pH is preferably controlled within the range of from about 4 to about 8, to minimize undesirable color development in the product.

Buffering agents may comprise an organic or inorganic acid or alkali metal salt thereof, or base or salt of such organic or inorganic acid, that has at least one $pK_a$ value and/or $pK_b$ value in the range of from about 4 to about 10, preferably from about 4.5 to about 9.5. Preferred buffering agents in the practice of the invention include, for example, phosphate buffers and acetate buffers. A "phosphate buffer" is a salt or a mixture of salts of phosphoric acid. An "acetate buffer" is a salt of acetic acid.

Buffering agents are preferably employed where potassium persulfate is employed as the radical initiator. A preferred buffering agent for use with persulfate radical initiators is sodium acetate. A preferred amount of sodium acetate buffer is from about 50 wt. % to about 150 wt. %, based on the weight of persulfate initiator added to the reaction. In one preferred embodiment, the initiator feed comprises approximately equal weights of potassium persulfate and sodium acetate in aqueous solution.

Antifoulant

The addition of a paraffin wax or hydrocarbon oil to the reaction serves as an antifoulant to minimize or prevent polymer adhesions to the reactor components. Any long chain saturated hydrocarbon wax or oil can perform this function. The amount of oil or wax added to the reactor is an amount which serves to minimize the formation of polymer adhesions on the reactor components. The amount is generally proportional to the interior surface area of the reactor and may vary from about 1 to about 40 mg per square centimeter of reactor interior surface area. The amount of paraffin wax or hydrocarbon oil is preferably about 5 $mg/cm^2$ of the reactor interior surface area.

Co-Polymerization Conditions

The temperature used for polymerization may vary, for example, from 20-130 degrees Celsius, depending on the initiator system chosen. The polymerization temperature is preferably from 35-130 degrees Celsius, and most preferably from 70-125 degrees Celsius.

The pressure used for polymerization may vary from 280-20,000 kPa, depending on the capabilities of the reaction equipment, the initiator system chosen, and the monomer selection. The polymerization pressure is preferably from 2,000-11,000 kPa, and most preferably from 2,750-6,900 kPa.

The polymerization occurs under stirring or other agitation. The stirring/agitation may be constant, or may be varied to optimize process conditions during the course of the polymerization. In one embodiment, both multiple stirring speeds and multiple temperatures are used for controlling the reaction.

According to one embodiment of the process of the invention, a pressurized polymerization reactor equipped with a stirrer and heat control means is charged with water, preferably deionized water, one or more halogenated monomers (1) and at least one fluorinated vinylic monomer. The mixture may optionally contain one or more of a surfactant, a buffering agent, an antifoulant or a chain-transfer agent for molecular weight regulation of the polymer product.

Prior to introduction of the monomer or monomers, air is preferably removed from the reactor in order to obtain an oxygen-free environment for the polymerization reaction.

The order in which the polymerization components are assembled may be varied, although it is generally preferred that at least a portion of the Monomer (1) is present in the aqueous reaction medium prior to the initiation of the polymerization of the fluorinated vinylic monomer. An additional amount of Monomer (1) may be fed to the reactor during the reaction.

In one embodiment, water, initiator, Monomer (1) and optionally surfactant, antifoulant, chain transfer agent and/or buffer are charged to the reactor, and the reactor heated to the desired reaction temperature. The fluorinated vinylic monomer(s) is(are) then fed into the reactor, preferably at a rate which provides an essentially constant pressure.

Alternatively the fluorinated vinylic monomer, Monomer (1) and initiator can be fed to the reactor, along with one or more of the optional ingredients. Other variations for fluoropolymer copolymerization processes are contemplated, as known in the art.

The monomer feed is terminated when the desired weight of monomer has been fed to the reactor. Additional radical initiator is optionally added, and the reaction is allowed to react out for a suitable amount of time. The reactor pressure drops as the monomer within the reactor is consumed.

Upon completion of the copolymerization reaction, the reactor is brought to ambient temperature and the residual unreacted monomer is vented to atmospheric pressure. The aqueous reaction medium containing the copolymer is then recovered from the reactor as a latex. The latex consists of a stable mixture of the reaction components, i.e., water, Monomer (1), initiator (and/or decomposition products of the initiator) and copolymer solids.

Generally, the latex contains from about 10 to about 50 weight percent copolymer solids. The polymer in the latex may be in the form of small particles having a size range of from about 30 nm to about 800 nm.

Product Handling

The product of the copolymerization is a latex which can be used in that form, usually after filtration of solid byproducts from the polymerization process, or which can be coagulated to isolate the solids, which may then be washed and dried. For use in latex form, the latex can be stabilized by the addition of a surfactant, which may be the same as or different from the surfactant present during polymerization (if any). This later added surfactant may, for example, be an ionic or non-ionic surfactant. In one embodiment of the invention, no fluorosurfactant is added to the latex. For solid product, the latex may be coagulated mechanically or by the addition of salts or acids, and then isolated by well-known means such as by filtration. Once isolated, solid product can be purified by washing or other techniques, and it may be dried for use as a powder, which can be further processed into granules, pellets or the like.

In one embodiment, the functional copolymer according to the invention is applied to a substrate, as a latex in water or as a solvent solution, the solvent being chosen among those listed above. Optionally, a primer layer can be applied to the substrate, before the layer of functional copolymer.

In one embodiment, said substrate is porous, for example a porous membrane.

EXAMPLES

Cathode Formulation and Fabrication

One exemplary cathode slurry preparation procedure for laboratory scale is described here. PVDF copolymer of the invention is first dissolved in N-methylpyrrolidone (NMP) solvent, typically in 5-10 wt % concentration. Conductive carbon additive, such as SuperP-Li from Timcal, is added to the binder solution, and mixed using a centrifugal planetary mixer, Thinky AR-310, for 3 repeats of 120 s at 2000 rpm with 1 min air cooling in between. Once the conductive carbon is dispersed in the binder solution, active material such as Celcore® NMC622 (Umicore), and small amount of NMP are added to the mixture, and mixed to form a thick and uniform paste, typically 60 s at 2000 rpm. Then small amount of NMP is added to the paste and mixed at 60 s/2000 rpm to gradually reduce the slurry solids (in about 1.5% with each NMP addition) and viscosity. This dilution step is repeated multiple time until the slurry viscosity reaches proper level for coating, typically 3,000-15,000 cP @ 1/s shear rate. A typical formulation for our laboratory cathode is active material/carbon/PVDF=97/1.5/1.5 (wt/wt/wt) on dry basis.

The cathode slurry is then cast onto aluminum foil (15 μm thickness) using adjustable doctor blade on an automatic film applicator (Elcometer 4340). The wet casting is then transferred to a convection oven, and dried at 120 C for 30 min. After drying, the electrode is calendered using a roll mill (IRM, international roll mill), to a final density of 3.2-3.6 g/cm3, with a typical value of 3.4 g/cm3. The typical areal mass loading of the dry cathode is 180-220 g/m2.

Peel strengths for cathodes were obtained via a 180° peel test using ASTM D903 with three modifications. The first modification was that the extension rate used was 50 mm/minute (peel rate of 25 mm/minute), electrodes were tested one day after fabrication, and the electrode was bonded to the alignment plate using double sided paper tape (3M Company, type 401M) with the flexible aluminum foil current collector peeled affixed in the testing grips.

NMR Analysis for % Incorporation: Samples solution was prepared at 1 wt % concentration in DMSO-d6 with heating at 90 C overnight. The 1H and 19F experiments were carried out using a Bruker AV III HD 500 (11.7 T) spectrometer equipped with a 5 mm TXO probe at 50° C. The peaks appearing around −160 ppm in the decoupled 19F spectrum (shifted and split vs. authentic poly(methyl 2-fluoroacrylate)) were taken as indicative of the incorporated comonomer and integrated vs. total PVDF signal.

Example 1: To a 2 gallon autoclave were added 3500 g of deionized water, 9.2 g of low molecular weight poly(acrylic acid) (BASF CP-10S), and 0.5 g of methyl 2-fluoroacrylate (MFA). The autoclave was agitated, heated to 100 C and pressurized to 650 psi with vinylidene fluoride. A 2.0 wt % feed of potassium persulfate was started at 2.0 mL/min. Upon start of pressure drop, an additional feed of MFA was started at 0.25 mL/min. and pressure was maintained by additional VDF feed. Feeds were continued in this fashion, increasing MFA feed rate to moderate instantaneous VDF feed demand to maintain a range of 500-1500 g/hr. MFA feed was increased in this fashion up to 1.0 mL/min. All feeds were continued until a total of 1650 g of VDF had been fed to the reactor, corresponding to 69.6 g of MFA. Monomer feeds were stopped and the pressure was allowed to autogenously decrease for 10 minutes at which point the reactor was vented to atmospheric pressure and cooled to room temperature. Latex was discharged from the reactor and dried in a convection oven overnight. 4993 g of latex was recovered with solids of 31 wt %.

Example 2: To a 2 gallon autoclave were added 3500 g of deionized water, 9.2 g of low molecular weight poly(acrylic acid) solution (BASF CP-10S), and 25 mL of sodium 2-fluoroacrylate (SFA) as 5.25 wt % solution in deionized water. The autoclave was agitated, heated to 100 C and pressurized to 650 psi with vinylidene fluoride. A 2.0 wt % feed of potassium persulfate was started at 2.0 mL/min. Upon start of pressure drop, an additional feed of SFA solution was started at 2.0 mL/min. and pressure was maintained by additional VDF feed. Feeds were continued in this fashion, increasing SFA feed rate in order to moderate instantaneous VDF feed demand to maintain a range of 500-1500 g/hr. SFA solution feed was increased in this fashion up to 10.0 mL/min. All feeds were continued until a total of 1650 g of VDF had been fed to the reactor, corresponding to 12.45 g of SFA solid. Monomer feeds were stopped and the pressure was allowed to autogenously decrease for 10 minutes at which point the reactor was vented to atmospheric pressure and cooled to room temperature. Latex was discharged from the reactor and dried in a convection oven overnight. 6046 g of latex was recovered with solids of 31.8 wt %.

Example 3: An identical procedure as outlined in Example 1 was used except a reaction temperature of 83 C was used and total of 1.15% MFA was fed vs. total VDF. Fluid latex was recovered with solids of 33.5 wt %.

Example 4: An identical procedure as outlined in Example 1 was used except a reaction temperature of 83 C was used and total of 2.30% MFA was fed vs. total VDF. Fluid latex was recovered with solids of 30.5 wt %.

| Example | Comonomer | Initiator Demand (ppm) | Comonomer Feed (vs. VDF total) (%) | Incorporation of comonomer into PVDF (%) | Solution Viscosity (5 wt % in NMP) | Electrode Peel Strength (N/m) |
|---|---|---|---|---|---|---|
| HSV-900 | None | ~900 | n/a | n/a | 881 | 18.7 |
| HSV-1800 | None | ~1500 | n/a | n/a | 441 | 22.3 |
| Control | Acrylic Acid | 12330 | 0.86 | 0.13 | 196 | 16.0 |
| 1 | Methyl 2-fluoroacrylate | 4177 | 4.25 | 180 | 33.3 | |
| 2 | Sodium 2-fluoroacrylate | 4251 | 0.75 | n/d | 401 | 19.1 |
| 3 | Methyl 2-fluoroacrylate | 1876 | 1.15 | n/d | 311 | >30 |
| 4 | Methyl 2-fluoroacrylate | 2737 | 2.30 | n/d | 265 | >30 |

What is claimed is:

1. A battery electrode comprising a fluorinated copolymer wherein the monomers units of the fluorinated copolymer consist of units based on vinylidene fluoride and units based on a halogenated monomer (1):

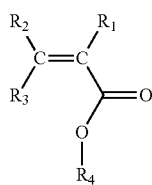

halogenated monomer (1)

wherein:

$R_1$, $R_2$, and $R_3$ is hydrogen or halogen, and at least one of $R_1$, $R_2$, and $R_3$ is halogen; and $R_4$ is a fluorinated oligomer of hexafluoropropylene oxide; an alkali metal; or an ammonium, alkylammonium, or alkylarylammonium ion.

2. The battery electrode of claim 1, wherein the fluorinated copolymer comprises up to 10.0 wt % of halogenated monomer (1).

3. The battery electrode of claim 1, wherein $R_1$ is fluorine.

4. The battery electrode of claim 1, wherein $R_1$ and $R_2$ are fluorine.

5. The battery electrode of claim 1, wherein $R_1$, $R_2$ and $R_3$ are fluorine.

6. The battery electrode of claim 3, wherein $R_4$ is an alkali metal, ammonium, or alkylammonium ion.

7. The battery electrode of claim 1, wherein $R_1$ and $R_2$ are fluorine and $R_4$ is an alkali metal, ammonium, or alkylammonium ion.

8. The battery electrode of claim 1, wherein $R_1$, $R_2$ and $R_3$ are fluorine and $R_4$ is an alkali metal, ammonium, or alkylammonium ion.

9. A battery electrode slurry formulation comprising a fluorinated copolymer in a solvent, wherein the monomer units of the fluorinated copolymer consist of units based on vinylidene fluoride and units based on a halogenated monomer (1):

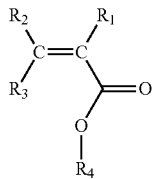

halogenated monomer (1)

wherein:

$R_1$, $R_2$, and $R_3$ is hydrogen or halogen, and at least one of $R_1$, $R_2$, and $R_3$ is halogen; and $R_4$ is a fluorinated oligomer of hexafluoropropylene oxide; an alkali metal; or an ammonium, alkylammonium, or alkylarylammonium ion.

10. The battery electrode slurry formulation of claim 9, wherein said solvent is chosen from: n-methylpyrrolidone (NMP), dimethylsulfoxide (DMSO), N, N-dimethylformamide (DMF), triethylphosphite (TEP), acetone, tetrahydrofuran, methyl ethylketone (MEK), methyl isobutyl ketone (MiBK), ethyl acetate (EA), butyl acetate (BA), ethylene carbonate (EC), propylene carbonate (PC), dimethyl carbonate (DMC), diethyl carbonate (DEC) or ethyl methyl carbonate (EMC).

11. The battery electrode slurry formulation of claim 9 further comprising conductive carbon additives and cathode active material particles selected from the group consisting of lithium iron phosphate (LFP), lithium nickel manganese cobalt oxide (NMC), lithium-manganese-cobalt-oxide (LCO), lithium-nickel-cobalt-aluminum oxide (NCA), lithium-manganese oxide (LMO), lithium-nickel-manganese-oxide (LNMO), and lithium manganese iron phosphate (LMFP).

12. The battery electrode slurry formulation of claim 9 further comprising conductive carbon additives and anode active material particles wherein the anode active material particles are selected from the group consisting of graphite, hard carbon, soft carbon, graphene, silicon, silicon monoxide (SiO), tin, and lithium titanate (LTO).

13. A process for preparing a fluorinated copolymer wherein the monomer units of the fluorinated copolymer consist of units based on vinylidene fluoride and units based on a halogenated monomer (1):

halogenated monomer (1)

wherein:

$R_1$, $R_2$, and $R_3$ is hydrogen or halogen, and at least one of $R_1$, $R_2$, and $R_3$ is halogen; and $R_4$ is a fluorinated oligomer of hexafluoropropylene oxide; an alkali metal; or an ammonium, alkylammonium, or alkylarylammonium ion, in an aqueous reaction medium, comprising:

a) forming an aqueous emulsion comprising at least one initiator, a stabilizer, vinylidene fluoride monomer, and halogenated monomer (1), b) initiating copolymerization of the vinylidene fluoride with said halogenated monomer (1) with stirring, under heat and super-atmospheric pressure, wherein no fluorinated surfactant is used in the process.

14. The process of claim 13, wherein copolymerization is carried out at a temperature of from about 35 to about 130 degrees Celsius and at a copolymerization pressure of from about 2750 to about 6900 kPa.

15. The process of claim 13, wherein the at least one initiator is a persulfate.

* * * * *